(12) United States Patent
Tipping et al.

(10) Patent No.: US 7,953,521 B2
(45) Date of Patent: May 31, 2011

(54) LEARNING CONTROLLER FOR VEHICLE CONTROL

(75) Inventors: Michael Tipping, Girton (GB); Mark Andrew Hatton, Eye (GB); Barry L. Brumitt, Seattle, WA (US)

(73) Assignee: Microsoft Corporation, Rdmond, WA (US)

( * ) Notice: Subject to any disclaimer, the term of this patent is extended or adjusted under 35 U.S.C. 154(b) by 58 days.

(21) Appl. No.: 11/323,697

(22) Filed: Dec. 30, 2005

(65) Prior Publication Data

US 2007/0156294 A1 Jul. 5, 2007

(51) Int. Cl.
*G06F 15/18* (2006.01)

(52) U.S. Cl. ............... 701/1; 700/47; 700/48; 700/52; 701/27; 701/44; 701/57; 701/58; 701/59; 701/60; 706/2; 273/442; 434/69; 463/6

(58) Field of Classification Search .............. 700/1, 28, 700/47, 48; 706/1, 2, 4, 6, 15–62, 903–909; 706/932; 703/2–8
See application file for complete search history.

(56) References Cited

U.S. PATENT DOCUMENTS

| | | | | |
|---|---|---|---|---|
| 5,577,913 A * | 11/1996 | Moncrief et al. | ............... | 434/69 |
| 5,801,621 A * | 9/1998 | Issa et al. | ............... | 340/439 |
| 5,921,780 A * | 7/1999 | Myers | ............... | 434/69 |
| 6,006,149 A * | 12/1999 | Salecker et al. | ............... | 701/51 |
| 6,144,910 A * | 11/2000 | Scarlett et al. | ............... | 701/50 |
| 6,208,914 B1 * | 3/2001 | Ward et al. | ............... | 701/3 |
| 6,236,908 B1 * | 5/2001 | Cheng et al. | ............... | 701/1 |
| 6,285,972 B1 * | 9/2001 | Barber | ............... | 703/8 |
| 6,431,872 B1 * | 8/2002 | Shiraishi et al. | ............... | 434/69 |
| 6,443,733 B1 * | 9/2002 | Stone | ............... | 434/45 |
| 6,581,048 B1 * | 6/2003 | Werbos | ............... | 706/23 |
| 6,611,737 B1 * | 8/2003 | El-Tahan et al. | ............... | 701/21 |
| 6,652,376 B1 * | 11/2003 | Yoshida et al. | ............... | 463/6 |
| 6,789,002 B1 * | 9/2004 | Hac et al. | ............... | 701/1 |
| 6,879,893 B2 * | 4/2005 | Woodard et al. | ............... | 701/29 |
| 7,047,114 B1 * | 5/2006 | Rogers | ............... | 701/21 |
| 7,143,363 B1 * | 11/2006 | Gaynor et al. | ............... | 715/771 |
| 7,212,135 B1 * | 5/2007 | Lynch et al. | ............... | 340/971 |
| 7,222,112 B2 * | 5/2007 | Jacobson | ............... | 706/39 |
| 7,266,532 B2 * | 9/2007 | Sutton et al. | ............... | 706/12 |
| 7,359,774 B2 * | 4/2008 | Grenn | ............... | 701/29 |
| 7,383,235 B1 * | 6/2008 | Ulyanov et al. | ............... | 706/13 |
| 2001/0027893 A1 * | 10/2001 | Nishizaki et al. | ............... | 180/409 |
| 2002/0128751 A1 * | 9/2002 | Engstrom et al. | ............... | 701/1 |
| 2002/0133329 A1 * | 9/2002 | Kano et al. | ............... | 703/22 |
| 2003/0114965 A1 * | 6/2003 | Fiechter et al. | ............... | 701/29 |
| 2003/0163237 A1 * | 8/2003 | Kim | ............... | 701/70 |
| 2003/0187567 A1 * | 10/2003 | Sulatisky et al. | ............... | 701/104 |
| 2003/0217021 A1 * | 11/2003 | Jacobson | ............... | 706/16 |
| 2004/0006410 A1 * | 1/2004 | Lee | ............... | 701/1 |
| 2004/0107038 A1 * | 6/2004 | Osumi | ............... | 701/102 |
| 2004/0193353 A1 * | 9/2004 | Dunoyer et al. | ............... | 701/96 |
| 2004/0225423 A1 * | 11/2004 | Carlson et al. | ............... | 701/36 |
| 2004/0242374 A1 * | 12/2004 | Wheals | ............... | 477/120 |
| 2004/0249533 A1 * | 12/2004 | Wheals et al. | ............... | 701/36 |
| 2004/0266526 A1 * | 12/2004 | Herbrich et al. | ............... | 463/33 |
| 2004/0267683 A1 * | 12/2004 | Herbrich et al. | ............... | 706/56 |

(Continued)

*Primary Examiner* — Jack Keith
*Assistant Examiner* — Jonathan M Dager

(57) ABSTRACT

A learning controller overcomes tuning problems in vehicle simulation programs by estimating requisite vehicle-specific parameters, effectively learning from its mistakes, as the vehicle is automatically driven around a track. After a sufficient period of calibration, the learned parameters are automatically saved to a car-specific file. The file parameters may be loaded in the controller in the future to optimally control a vehicle without the need to re-run the learning procedure.

12 Claims, 10 Drawing Sheets

U.S. PATENT DOCUMENTS

| | | |
|---|---|---|
| 2005/0096823 A1* | 5/2005 | Soliman et al. ................. 701/55 |
| 2005/0159851 A1* | 7/2005 | Engstrom et al. ................. 701/1 |
| 2005/0209751 A1* | 9/2005 | Kato ............................... 701/41 |
| 2005/0240319 A1* | 10/2005 | Sawada ............................ 701/1 |
| 2005/0267608 A1* | 12/2005 | Nishira et al. .................. 700/44 |
| 2006/0015231 A1* | 1/2006 | Yoshimura et al. ............. 701/48 |
| 2006/0095193 A1* | 5/2006 | Nishira et al. .................. 701/96 |
| 2006/0106584 A1* | 5/2006 | Oesterling et al. ................ 703/1 |
| 2006/0184305 A1* | 8/2006 | Jacobson ........................ 701/59 |
| 2006/0235600 A1* | 10/2006 | Dudek ........................... 701/102 |
| 2006/0293817 A1* | 12/2006 | Hagiwara et al. ............... 701/40 |
| 2007/0066403 A1* | 3/2007 | Conkwright .................... 463/43 |
| 2007/0111768 A1* | 5/2007 | Tipping et al. ................... 463/6 |
| 2007/0118260 A1* | 5/2007 | Gade .............................. 701/37 |
| 2007/0127811 A1* | 6/2007 | Luo ............................... 382/159 |
| 2007/0156315 A1* | 7/2007 | Raab et al. ..................... 701/38 |

* cited by examiner

LEARNING CONTROLLER FOR VEHICLE CONTROL

BACKGROUND

In racing video games, such as on a desktop computer, video game console, or other system, a player typically maneuvers a racer along a track in a virtual environment. Exemplary racers may include race cars or other vehicles, player avatars, and other racing entities. Furthermore, racing typically includes a competitive characteristic, for example, racing for speed or accuracy (e.g., through gates), jumping for distance, racing with fuel conservation goals, and dog-fighting. Additionally, a racer may be challenged by other competitors, either actual players, or an artificial competitor generated by the computer operating under an artificial intelligence (AI) program. Such competitive characteristics can challenge the player in controlling the racer along a path, such as a race track or other route.

A control system, generally including steering, acceleration, and brake systems, is required to maintain a computer-controlled racer along a path. A control system in a video game or other simulation works in conjunction with a physics engine system that calculates the physical response of a racer. Such a control system needs to be calibrated with appropriate initialization parameters to appropriately respond to input commands and create a realistic response. An uncalibrated steering system (i.e., one with arbitrary parameter settings) combined with a non-trivial physics model will result in observably sub-standard performance. The vehicle is likely to exhibit visibly significant under-steering, over-steering, and/or oscillation about a desired line.

Further, the parameters for one type of racer are not generally transferable to another type of racer presuming a moderately sophisticated physics engine. For example, parameters for a Ford Focus may be painstakingly hand-tuned such that it satisfactorily follows a desired line. However, using the same control system and parameters for an Audi R8 or a Corvette Stingray, for example, would result in very poor performance. It is inevitable that, for any implementation with a faithful and non-trivial physics simulation system, some car-specific parameters will always require tuning. For any video game with a significant number of cars (and many now feature well over a hundred), it is practically infeasible to tune these parameters manually.

To avoid this issue, video games generally "cheat" in some way. Some games may use a simplified physics model for AI-controlled cars, or bypass it altogether. Other games imbue the AI-controlled cars with considerably increased traction compared to the human player—greater control results if the AI-controlled car is "stuck" to the road. Other games may use similar "hacks," and these all result in diminished realism, and so negatively impact the game-play experience of the player.

The information included in this Background section of the specification, including any references cited herein and any description or discussion thereof, is included for technical reference purposes only and is not to be regarded subject matter by which the scope of the invention is to be bound.

SUMMARY

Implementations described and claimed herein address the foregoing problems with vehicle control systems by automatically developing vehicle-specific parameters. A "learning controller" overcomes the tuning problems in vehicle simulation programs by estimating the requisite parameters, effectively learning from its mistakes, as the vehicle is automatically driven around a track. The controller compares motional data between a starting point and an ending point for a cycle of a physics engine that defines the motion of the vehicle and "learns" the effects of input parameters on specific vehicle types under specific motional and environmental conditions. The controller refines the input parameters over each successive cycle of the simulation until an optimal set of parameters for the specific vehicle are determined. The controller system requires no user intervention. After a sufficient period of auto-calibration, the learned parameters are automatically saved to a car-specific file that may be loaded by a control system in the future without need to re-run the learning procedure.

Other features, details, utilities, and advantages of the present invention will be apparent from the following more particular written description of various embodiments of the invention as further illustrated in the accompanying drawings and defined in the appended claims.

DETAILED DESCRIPTION

Figure 1:
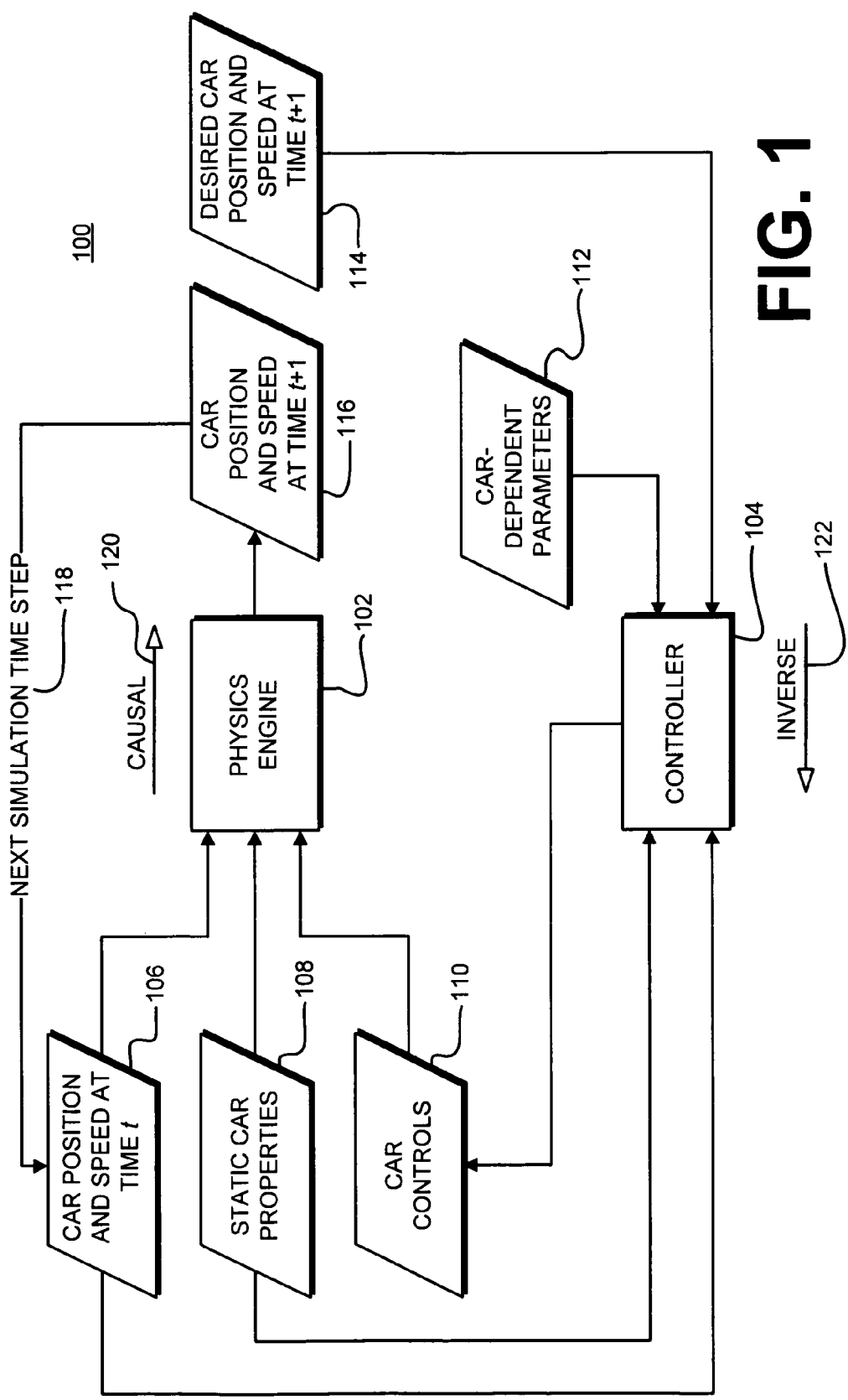
FIG. 1 is a schematic diagram of an implementation of a control system for controlling movement of a vehicle along a path.

This discussion considers the problem of specifying appropriate control instructions for simulated vehicles in computer programs. Although described in exemplary implementations herein primarily with respect to computer simulations for the purpose of designing more realistic race car driving video games, nothing in the system precludes more general applicability to real-world vehicle control systems. Further, it should be understood that such control instructions may apply to any game in which the position of player or opponent representations may be reactively controlled, for example, by a user or the game's artificial intelligence engine, and is not limited to automobile or other driven vehicle game contexts. As such, the control systems described herein are applicable to a simulated running or flying character in a video game, for example, outside of a vehicle context.

A prototypical program may be an auto racing video game in which a player races against a number of opponent cars, whose behavior is simulated by a "physics" system in conjunction with an "artificial intelligence" (AI) system. A driving design goal behind many computer racing games is to make the experience as realistic as possible for the player. To this end, players have the ability to choose between a large number of cars and race tracks. In many cases, these car and track choices are emulative of actual race cars and actual race tracks from around the world. When a player races against other players, the physics system is programmed to create realistic responses to user input. When a player races against computer controlled opponents, the physics system and AI system are programmed to create realistic opposition.

The physics engine module in the video game simulates the physical forces within the video game, including gravitational forces, frictional forces, collision effects, mechanical problems, track conditions, etc. Racer properties can be input to the physics engine module to compute the maximum sustainable lateral acceleration force (e.g., how capably the racer can corner), the maximum sustainable longitudinal deceleration (e.g., how capably the racer can brake), and the maximum straight line velocity (collectively, "racer limits"). Each of these properties may be obtained from the physics engine, which simulates the game action based on a broad assortment of environmental parameters and other inputs. It should be understood that such racer properties may change during game play, such as if the racer is damaged during a race.

To specify the vehicle behaviour, the AI system will typically decompose the overall behaviour specification task into several sub-tasks, for example, determination of the speed a car should follow and determination of a route or "racing line"—a sequence of positions in the simulated world that the car is desired to follow. An additional behavior determined by the AI system may be specification of control of the car through steering, acceleration, and braking based upon parameters specific to, for example, the type of race car, the design of the track, and the track conditions.

The problem of "control" is one that is closely related to a simulation engine's physics modelling system (or simply the laws of physics themselves in a real-world control scenario). Scientifically-speaking, the physics engine system models "causal" phenomena, i.e., it calculates (numerically) what would happen to a vehicle from one time step to the next given its current state (position on the track, velocity, angle, etc.), its physical properties (engine power, tire grip, etc.) and its actuations (steering, accelerator, brake). Although many variables may be involved and the necessary computation very significant, this is a relatively straight-forward computation to perform mathematically.

More problematically, a control system must perform an "inversion" of the game's physics model. In other words, given the current state of the car, and a desired future state, the controller must deduce the necessary actuations to realistically move the car from the current state to the desired future state. The relationship between the "causal" physics model and the "inverse" controller model is illustrated in FIG. 1.

An implementation of a control system 100 as depicted in FIG. 1 centers around a physics simulation system 102 and a controller 104. The physics engine 102 models the position and response of the vehicles in the video game based upon the both static characteristics of each vehicle and dynamic characteristics of the game environment.

Several data inputs to the physics engine 102 provide the necessary information for completion of such calculations. A first data set 106 provides motional information i.e., a car's position in the game environment (e.g., on a track) and its speed at an instant in time t, and may further include actual environmental conditions at time t (e.g., track camber and slope, track surface material, track wetness, tire temperature, and tire wear). A second data set 108 provides information about static properties of the car, for example, mass, tire size, tire grip, braking capacity, acceleration capacity, and suspension characteristics. A third data set 110 provides control information for the car, for example, steering, braking, or acceleration values, output from the controller 104.

There are also several data inputs to the controller 104 that provide the necessary information for calculation of the steering, braking, and acceleration values. As with the physics engine 102, motional information about the car's position and speed from the first data set 106 is input to the controller 104. The static property information from the second data set 108 is also input to the controller 104.

Additionally, a fourth data set 112 of car-dependent parameters is input to the controller 104. These car-dependent parameters are car-specific values for control functions such as braking, accelerating, or steering. A typical value, for example, may be a steering amount to return a vehicle to a desired racing line when the vehicle is a certain number of degrees off the racing line.

Further, a fifth data set 114 of motional information indicating the desired speed and position of the car at the next processing increment t+1 is input to the controller 104. The controller 104 processes these various data inputs to develop the third data set 110 of car control values for input to the physics engine 102. The output of the physics engine 102 is a sixth data set 116 of motional information defining the car's position and speed at time t+1 in the video game or other simulation. The control system 100 iterates at regular time steps 118, for example, twice per second, to calculate new car position and speed values.

As indicated by the arrow 120 in FIG. 1, the calculations of the physics engine 102 are causal in nature. Conversely, the calculations of the controller 104 are inverse in nature as indicated by the arrow 122 in the opposing direction.

Mathematically-speaking, modelling an "inverse problem" is much harder than modelling a "causal" system. In fact, in most cases, including here, there is no formal analytic solution to the problem. For example, imagine a relatively simple system where the output Y of the engine is modelled by a fifth-order polynomial equation dependent on some real-valued input X and some real-valued control signal C, such that $Y=P_5(X, C)$. This causal system can be very easily computed in practice.

The inverse control problem would then be of the form, for example, "given we want Y=6 when X=2, what is C?" Mathematically, we must solve $P_5(2,C)=6$ for C, which turns out to be impossible (and in fact, provably impossible, as shown by Galois nearly 200 years ago). In actuality, most simulation systems are considerably more complex than this, and thus even harder to solve for.

To find solutions to such control problems, workable (and hopefully accurate) approximations may be sought. However, in the context of vehicle simulation, even deriving an algorithm to approximately follow a desired line and speed is very difficult if the physics system is non-trivial. Further, an uncalibrated steering system (i.e. one with arbitrary parameter settings) combined with a non-trivial physics model will result in observably substandard performance. The vehicle is likely to exhibit visibly significant under-steering, over-steering, and/or oscillation about its desired line. Racing games with simple physics and environment models can suffice with a simple algorithmic control model. Games with more complex physics generally "dumb down" the models of the nonplayer, AI-controlled cars. Other games may "cheat," for example, by giving the AI-controlled cars exaggerated grip between the tires and the road, which makes control much simpler.

In order to maximise the racing experience, fidelity in the simulation models is very important. Thus, it is undesirable to cheat or dumb down the physics engine system for the AI-controlled cars. The more complex the driving physics engine is, the more accurate the game experience. A control algorithm that can follow a desired line and speed with acceptable accuracy inevitably depends on parameters (shown in the diagram) that must be hand-crafted or tuned for every individual car, to take account of the very different physical properties of the car, e.g., acceleration ability, braking capacity, steering response, mass, suspension, and tire grip. As a result, the control problem becomes very difficult and is probably relatively close to the difficulty of controlling a real-world vehicle.

A "learning controller" as described herein effectively overcomes this tuning problem by estimating the requisite parameters, effectively "learning from its mistakes", as the vehicle is automatically driven around the track. After a sufficient period of this "auto-calibration", the learned parameters are automatically saved to a car-specific file that may be loaded in future without the need to run the learning procedure.

Figure 2:
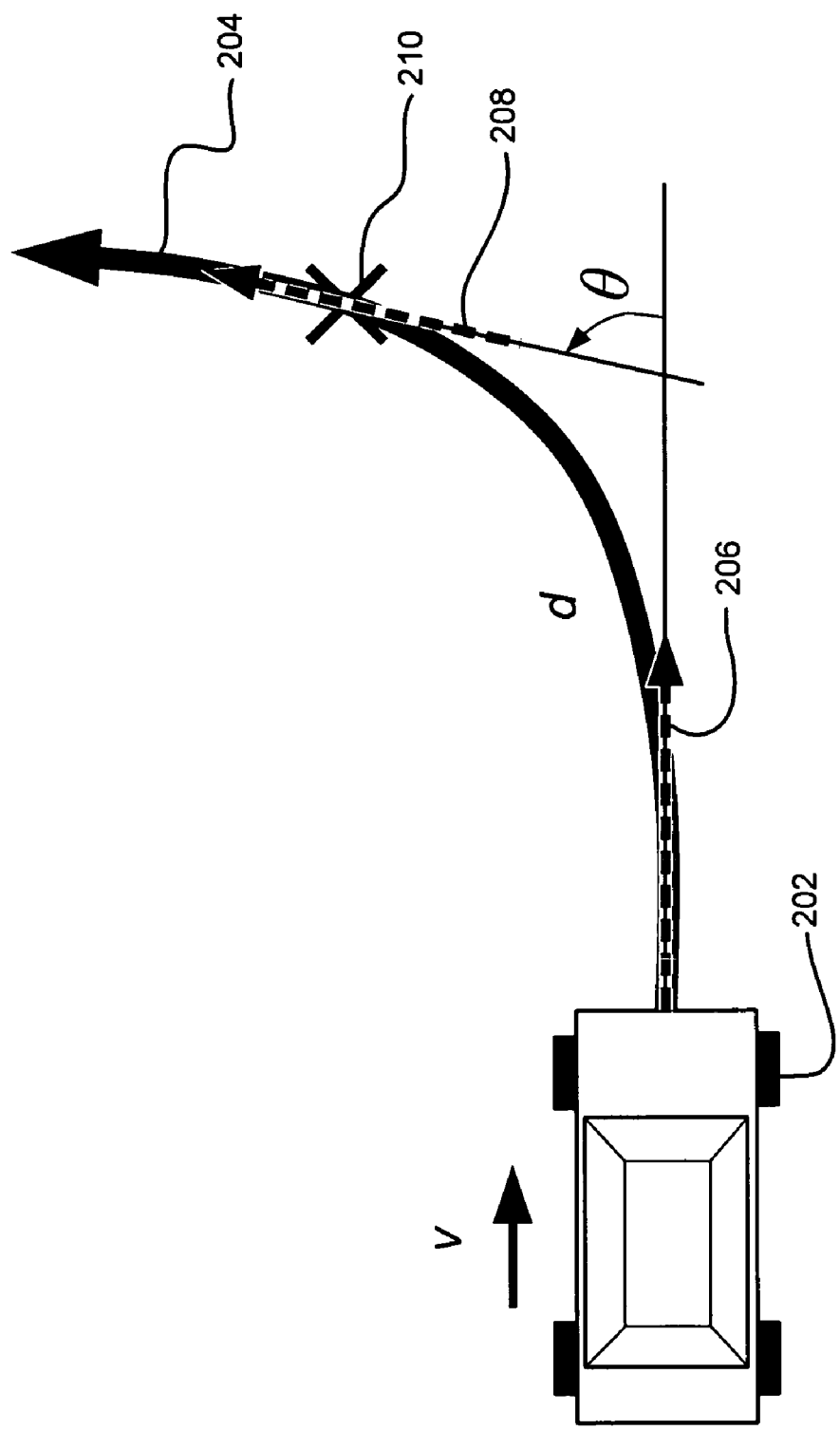
FIG. 2 is a schematic diagram illustrating control considerations for steering a vehicle along a path.

In particular, if one considers the steering control task alone, an exemplary question posed to the controller is basically "how much do I have to turn the steering wheel if the car is traveling at 40 MPH and needs to turn an angle of 5 degrees to the left in the next 0.5 seconds?" Indeed, the time element, "0.5 seconds," begs another question: "how far do I need to look ahead in order to reactively steer in time?" FIG. 2 illustrates this relatively simple steering problem.

In a simplified view of steering dynamics, one may assume that a vehicle 202 is on a specified racing line 204 (which may be any kind of line: good, bad or indifferent) and for each update of the physics system (e.g., every 1/60th of a second) the steering system is actuated such that the car follows the racing line 204 as closely as possible. In one implementation, actuation may be quantified by an incremental value for the steering control ranging from −1 to +1.

If the vehicle 202, travelling at current speed v, is to change from its present trajectory 206 to a future trajectory 208 along the racing line 204, a steering angle s may be computed such that the vehicle 202 will adhere to the racing line 204 as closely as possible. To achieve this, a basic control system may calculate an appropriate "target point" 210 along the desired path a distance d away from the present position of the vehicle 202 The control system may then calculate an angle of deviation θ between the present trajectory 206 and the future trajectory 208 at the target point 210. Then, using trigonometry, a desired "yaw rate" $\dot{\theta}$ may be computed for the vehicle 202. From the yaw rate, a putative steering angle s may be estimated. For example, a steering angle s may be simply expressed as some function of velocity v and desired yaw rate: $s=f(\dot{\theta},v)$.

The actual dynamics of the vehicle 202 traveling from its current position to the target position 210 will be governed by the outcome of several physical simulation system iterations. This overall system would typically be very complex, and for the purposes of control, a simpler physical summary of vehicle dynamics during the turn is needed. One way to do this is to focus on the yaw rate $\dot{\theta}$. If the vehicle 202 is to reach the target point 210 with the given orientation depicted in FIG. 2, then the vehicle 202 must turn through the angle θ. If we assume that the vehicle velocity v remains approximately constant during that time, then the vehicle 202 must turn in time d/v and so its desired "average yaw rate" is given by $\dot{v}=\theta v/d$.

Based on the above representation, the control question becomes: "what steering value should be set so that the yaw rate will be the desired $\dot{\theta}$?" However, it is this conversion of desired yaw rate to steering angle that depends on the properties of the specific vehicle, and this would be encapsulated by some parameters within the function $f(\dot{\theta},v)$. These parameters will depend on the conditions pertaining at the time (including, for example, both track conditions, e.g., wetness, and car conditions, e.g., speed). Such a method is highly dependent on the characteristics of the individual car itself, and one would have to determine (perhaps many) appropriate parameters specific to each vehicle (of perhaps several hundred vehicles), in order for the system to function sufficiently accurately for all possible cars. As noted, however, it is practically infeasible to tune control system parameters for steering, acceleration, and braking systems for each vehicle by hand.

Thus there are two primary contributors to the efficacy of the vehicle controller. First is the actual control algorithm, i.e., the specification of the precise form of the function $s=f(\dot{\theta},v)$. Second is the method for estimating appropriate car-dependent parameter settings for that function. The exact mechanism by which the system "learns" from its mistakes very much depends on the form of the steering model $s=f(\dot{\theta},v)$. However, the control system is relatively agnostic as to the exact form of the model. Thus, a mechanism for automating the development of control system parameters that can determine parameters specific to any vehicle configuration becomes important. A learning system incorporated with a controller system as further described herein fulfills this need for automated parameter development by estimating the requisite parameters, effectively "learning from its mistakes", as the vehicle is automatically driven around the track.

Figure 3:
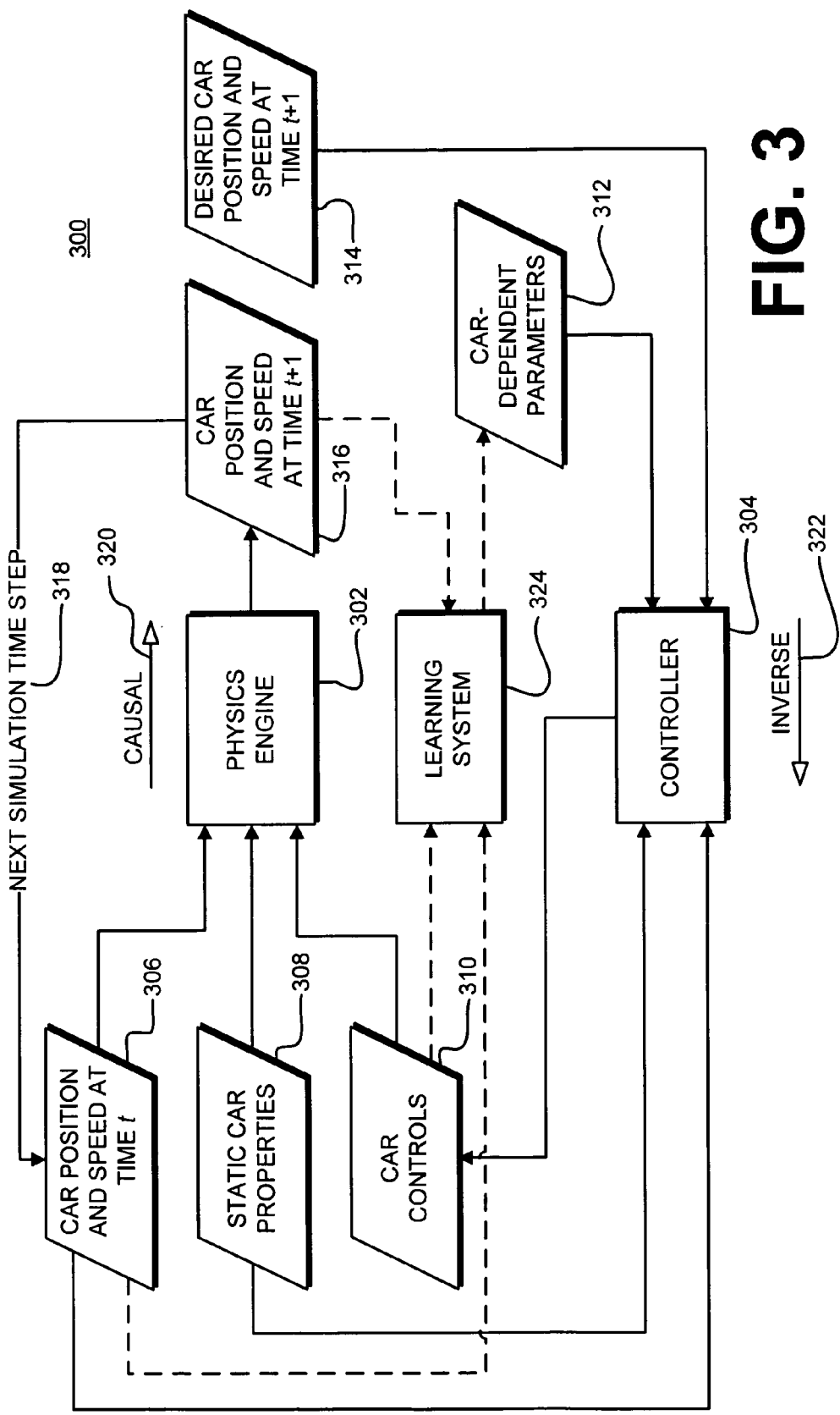
FIG. 3 is a schematic diagram of a further implementation of a control system for controlling movement of a vehicle incorporating a learning system.

A schematic of one implementation of a complete controller system 300 is depicted in FIG. 3, which is an augmented version of FIG. 1 with a learning system module 324 now added. As in FIG. 1 the control system 300 of FIG. 3 centers on a physics simulation system 302 and a controller 304. As before, the physics engine 302 models the position and response of the vehicles in the video game based upon the both static characteristics of each vehicle and dynamic characteristics of the game environment.

Several data inputs to the physics engine 302 provide the necessary information for completion of the causal 320 calculations. The first data set 306 provides motional information, i.e., a car's position in the game environment (e.g., on a track) and its speed at an instant in time t, and may further provide actual environmental conditions at time t (e.g., track camber and slope, track surface material, track wetness, tire temperature, and tire wear). The second data set 308 provides information about static properties of the car and/or environment, for example, mass, tire size, tire grip, braking capacity, acceleration capacity, and suspension characteristics. The third data set 310 provides control information for the car, for example, steering, braking, or acceleration values, output from the controller 304.

There are also several data inputs to the controller 304 that provide the necessary information for calculation of the steering, braking, and acceleration values. As with the physics engine 302, motional information about the car's position and speed from the first data set 306 is input to the controller 304. The static property information from the second data set 308 is also input to the controller 304.

Additionally, the fourth data set 312 of car-dependent parameters is input to the controller 304. These car-dependent parameters are optimal car-specific values generated by the learning system 324 for control functions such as braking, accelerating, or steering. Optimal parameters may be considered values that cause a vehicle to perform accurately at a given speed and hold to a racing line regardless of the quality of the racing line. The fifth data set 314 of motional information indicating the desired speed and position of the car at the next processing increment t+1 is also input to the controller 304.

The controller 304 performs the inverse processing 322 of these various data inputs to calculate the third data set 310 of car control values for input to the physics engine 302. The output of the physics engine 302 is a sixth data set 316 of motional information defining the car's position and speed at time t+1 in the video game or other simulation. The control system 300 iterates at regular time steps 318, for example, twice per frame (60 times per second), to calculate new car position and speed values.

As indicated in FIG. 3, the learning system 324 receives input data from the first data set 306 identifying the car position, speed, and environmental factors at time t. The learning system 324 also receives data input from the third data set 310 of car controls previously computed by the controller 304 in the prior time step. The learning system 324 further receives data input from the sixth data set 316 of the car's position and speed at time t+1 computed in the prior iteration by the physics engine 302.

The learning system 324 observes how the actuations specified by the controller 304 influence the car position and speed from time step t to t+1, and uses this information to calibrate the car-dependent parameters 312 required by the controller 304. The learning system 324 continues to adjust the car dependent parameters 312, comparing the first data set 306 of car position and speed at time t to the sixth data set 316 of the position and speed of the car at time t+1 to learn what effect the car control data 310 determined by the controller 304 using the car-dependent parameters 312 had on the position and speed of the car between time t and t+1. When the calibration procedure is complete and the car-dependent parameters 312 are optimized, the controller 304 may be "run" without the learning system 324 continuing to update the car-dependent parameters 312.

For notational convenience, consider that all the "relevant parameters" suggested earlier, a subset of the first data set 306, are grouped together in some set X. These factors could be, but are not necessarily limited to, measurements such as: track camber and slope, track surface material, track wetness, car velocity, tire temperature, and tire wear. At each time step or cycle through the physics simulation system 302, the parameters X and the steering s, which could be actuated by some "baseline" controller (it doesn't matter if the controller is a good one or not) are measured. Then at the next time step the resultant yaw rate $\dot{\theta}$ may be measured.

In one exemplary implementation, the vehicle to be controlled may be initialized with a "baseline" controller, i.e., a controller that is uncalibrated. In general, an uncalibrated controller "knows" that to turn left the car has to steer left, and to speed up or slow down the car needs to accelerate or brake, respectively. However, the controller does not know by how much to steer, brake, or accelerate.

The vehicle is placed on some track and is provided a racing line and speed profile to be followed. The algorithm in the controller then runs and attempts to follow the racing line at the appropriate speed. During this learning phase, each time the vehicle takes a control action it observes the subsequent outcome and updates a speed-based model of the corresponding control response. For example, if the controller specifies that the vehicle steers 30% right at 40 MPH and the vehicle is observed to deviate 5 degrees-per-second (the yaw rate) to the right during the next simulation time-step, this information is used to update the model and improve future control actions. So if the vehicle later estimates that it needs to steer right at a rate of 5 degrees-per-second when travelling at 40 MPH, it would know that 30% right steering was approximately appropriate.

A direct way to 'learn' a control model may be via the system described above, which outputs the required steering angle s given the desired yaw rate $\dot{\theta}$ and relevant parameters X as input. Thus, a functional model can be developed as follows:

$$s = f(\dot{\theta}, X; \Gamma), \tag{1}$$

where $\Gamma$ are some parameters that are adapted, perhaps via some nonlinear optimization procedure, or they could simply be values stored in a table. In this manner the function $f$ predicts as accurately as possible the steering action that caused the observed yaw rate.

While such an approach might work, it may not be a sensible strategy. Because this is an inverse model, and such models are typically much more complex than forward causal models, the model may require many more parameters in order to be accurate, and is therefore much more difficult to automatically learn. In particular, inverse models may be "one-to-many" in that it is entirely possible that identical values of $\dot{\theta}$ and X will result from different values of s. This is highly problematic to such a model.

A better approach may be to automatically infer the causal system, and then perform the inversion (or control) step in a separate stage. Here, given observations of s, X and $\dot{\theta}$ as before, we attempt to infer a function:

$$\dot{\theta} = f(s, X; \Gamma) \tag{2}$$

This forward, causal model may be significantly less complex than the inverse model, cannot be one-to-many, requires fewer parameters, and is easier to learn automatically. While the causal model relies on the fact that X contains all the relevant measurements that may influence the outcome observed, in practice many factors that will have some effect may be ignored. Thus, the one-to-many issue will be much less pronounced with the causal model. For control purposes, an inversion of this model will still have to be performed at a later stage. However, direct learning of the causal model, rather than the inverse model, is the mathematically superior approach to take.

Thus, the type of mathematical model for implementing the function $f(s, X; \Gamma)$ needs to be specified. Such a model could, for example, be a polynomial model, or even a neural network. However, account should be taken of the fact that once the model is 'learned,' it will need to be inverted, i.e., given $\dot{\theta}$ and X, we need to find the appropriate s. As noted previously, this may be analytically impossible (i.e., it may be that an answer can only be approximated). A complex model will likely be computationally complex to invert (e.g., requiring an iterative algorithm), and as the controller is run often (e.g., every $\frac{1}{60}$th of a second) to create a realistic response, this procedure needs be relatively quick. So both for reasons of mathematical simplicity and computational efficiency, there is motivation to employ as simple a model as possible.

One simple approach is to create a large multi-dimensional table. Each factor of X may be separated into some appropriate number of cells, along with the steering angle s. Then at every time step a stored average of the observed yaw rate $\dot{\theta}$ may be updated in the appropriate table cell location. Inverting this model (i.e., performing control) is then relatively straightforward. We find the appropriate row of the multi-dimensional table indexed by the current values of the factors, then search that row, along the steering angle index s, and find the value of s which indexes the table entry closest to the desired yaw rate $\dot{\theta}$.

One problem with a tabular approach is that the number of cells to be filled during the learning phase grows exponentially with the number of variables that index it. Unless very few factors of X are used, after learning during the control phase, many of the table entries would be empty. One way to work around this is to judiciously discard many of the factors X and retain only those that are significantly influential, thus making the table much smaller. This may be practical if only the speed of the vehicle v is retained. Two exemplary tabular implementations for steering control indexing vehicle speed are described below. Additional tables for braking and acceleration values may be similarly implemented.

Figure 4:
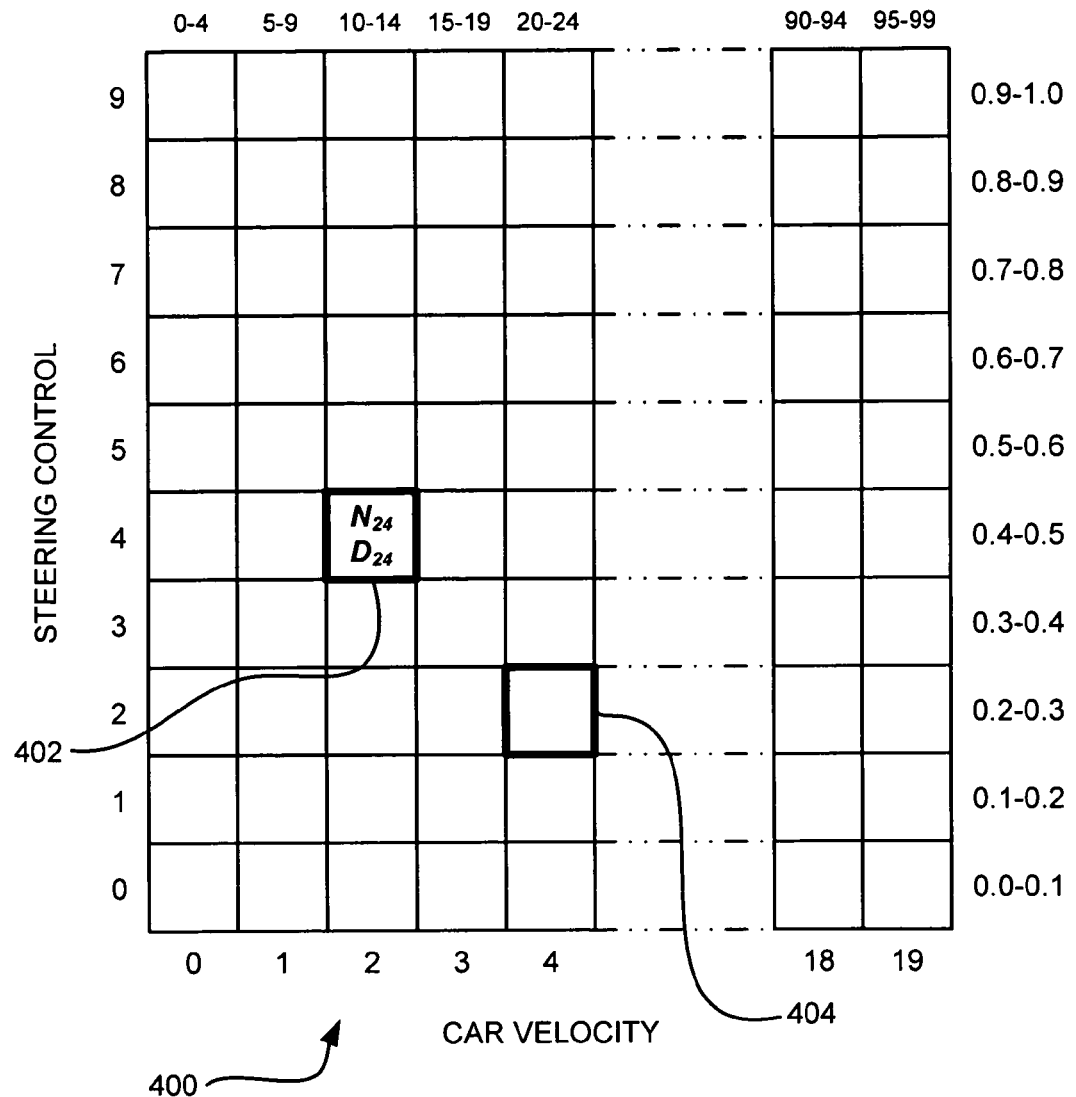
FIG. 4 is a schematic diagram of a two-dimensional table for storing control parameter data.

In a first approach depicted in FIG. 4, a two-dimensional table 400 may be indexed both by the vehicle's velocity and by the steering angle itself. The car velocity variable from zero to the top speed of the given car (99 in this example) is divided into ranges of five units each over 20 cells. For steering, the distinction between left and right is ignored, the control value ranges from 0.0 to 1.0, and the control value is separated in ranges over 10 cells. It should be apparent that a lower or higher resolution of range separation for either variable could be used. Also, left and right steering could be treated individually, for example, by enumerating a range between −1 and +1.

At each table location, running averages of the yaw rate are stored and updated. The running average comprises a numerator (yaw rate value) N and the denominator (count) D. For example, in the learning phase, if the car was traveling at 12 meters/second and the steering angle had been set to 0.44, then the numerator $N_{24}$ in the cell 402 at column 2, row 4 would be updated with the running total of the yaw rate and the denominator and $D_{24}$ would be updated with the count of updates to the cell 402. If during a subsequent control phase the car was traveling at 24 meters/second and the desired yaw rate was $\dot{\theta}$, then the column 4 would be scanned to find the closest value match to the desired yaw rate $\dot{\theta}$ and the corresponding centroid value of s for the row would be returned. For example, if the cell 404 at column 4, row 2 contained the closest value to the desired $\dot{\theta}$, then s=0.25 would be returned.

Figure 5:
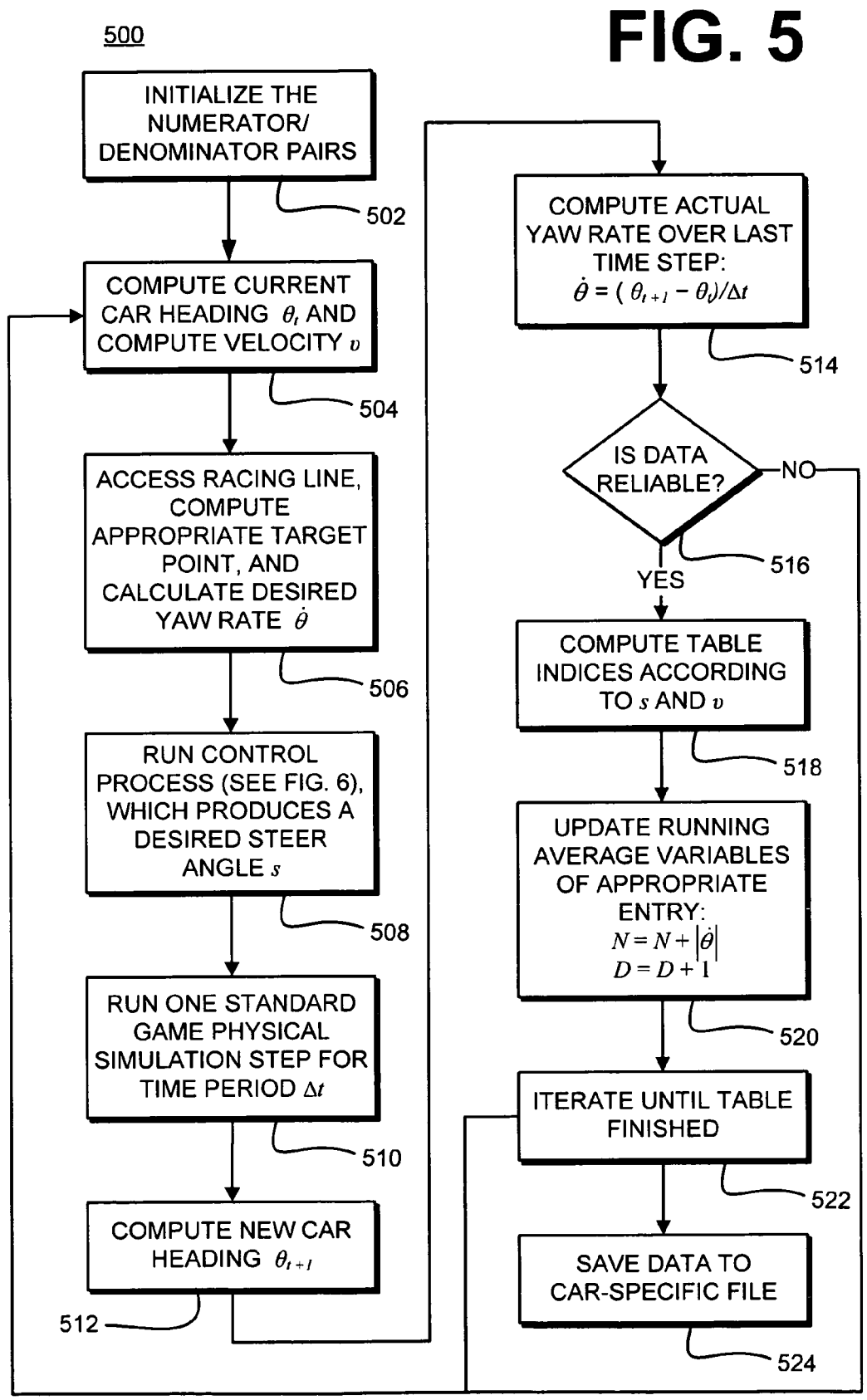
FIG. 5 is a flow diagram depicting the operations of one implementation of a learning controller system using a two-dimensional data table.

An implementation of the learning process for determining steering parameters at development time is depicted in FIG. 5. The learning process 500 begins with an initialization operation 502 in which the numerator/denominator pairs are initialized with some value. The controller needs 'priming' so that it can be used before (and at the same time as) any values are stored in the table. For example, every table value may simply be set to N=2 and D=1.

A first computing operation 504 follows in which the current car directional heading $\theta_t$ and velocity v are computed. In a second computing operation 506, a base racing line is accessed, an appropriate target point is computed (as depicted in FIG. 2), and a desired yaw rate $\dot{\theta}$ is calculated.

Next a process operation 508 is run wherein the control controller produces a desired steering angle s. The operations performed by the controller in computing the steering angle s for this implementation are more fully described with respect to FIG. 6 herein. In the following simulation operation 510, a standard game physical simulation step for time period Δt is performed. In a third computing operation 512, a new car heading $\theta_{t+1}$ is calculated. Using the new direction information $\theta_{t+1}$, a fourth computing operation 514 computes the actual yaw rate over last time step: $\dot{\theta}=(\theta_{t+1}-\theta_t)/\Delta t$ .

A decision operation 516 is then performed ensure the reliability of the data. Indicators of unreliable data may, for example, include: s=0, (i.e., no steering occurred); the sign of s is different from sign of $\dot{\theta}$ (i.e. the car turns opposite to the steering input); the car is skidding; and the car is off the track. If any of these conditions is true, the process returns to the first computing operation 504.

If in the decision operation 516, the data is considered reliable for this time step, a fifth computing operation 518 computes appropriate table cell indices according to v and s. Next, in an updating operation 520, a running average of the variables of the appropriate cell entry are updated as follows: $N=N+|\dot{\theta}|$ and $D=D+1$. Once the cell values are updated, the learning process 500 iterates in an iteration operation 522 by returning to the first computing operation 504 until the learning process 500 has optimized the steering parameters.

An adequate number of iterations may be based upon some measure of accuracy of the controller. For example, the difference between the desired yaw rate and the observed yaw rate may be continuously compared at each time step. As the controller learns, this difference should decrease. Although the difference is unlikely to reach zero, it should eventually converge at some minimum value.

A practical measure may be the distance of the car to the racing line at the current waypoint, which ideally should be as close to zero as possible. Whatever measure is used, the procedure may be terminated when the measure is considered to have converged, i.e., it is not reducing substantially further. For example, the routine may terminate if the distance to the racing line had not decreased on average by more than 1% over the previous 100 time steps. In a final saving operation 524, the optimized car-parameter values of the table for the particular car are saved to a car-specific file.

In order to obtain a variety of plentiful data, the learning process 500 may be run for each car option while each car drives 3 laps on each of 5 different tracks. This is generally sufficient to ensure that the speed-dependent steering, acceleration, and braking response models converge to acceptably accurate average values. The controller is only initialized using the initialization operation 502 at the start of the first lap of the first track. The controller is thus continuously updated, and should continuously improve, as the car continues to drive around the track. This learning process 500 is repeated, and is typically fully automated to run over the full car set, every time there is a change in the physics model and/or the car parameters.

Figure 6:
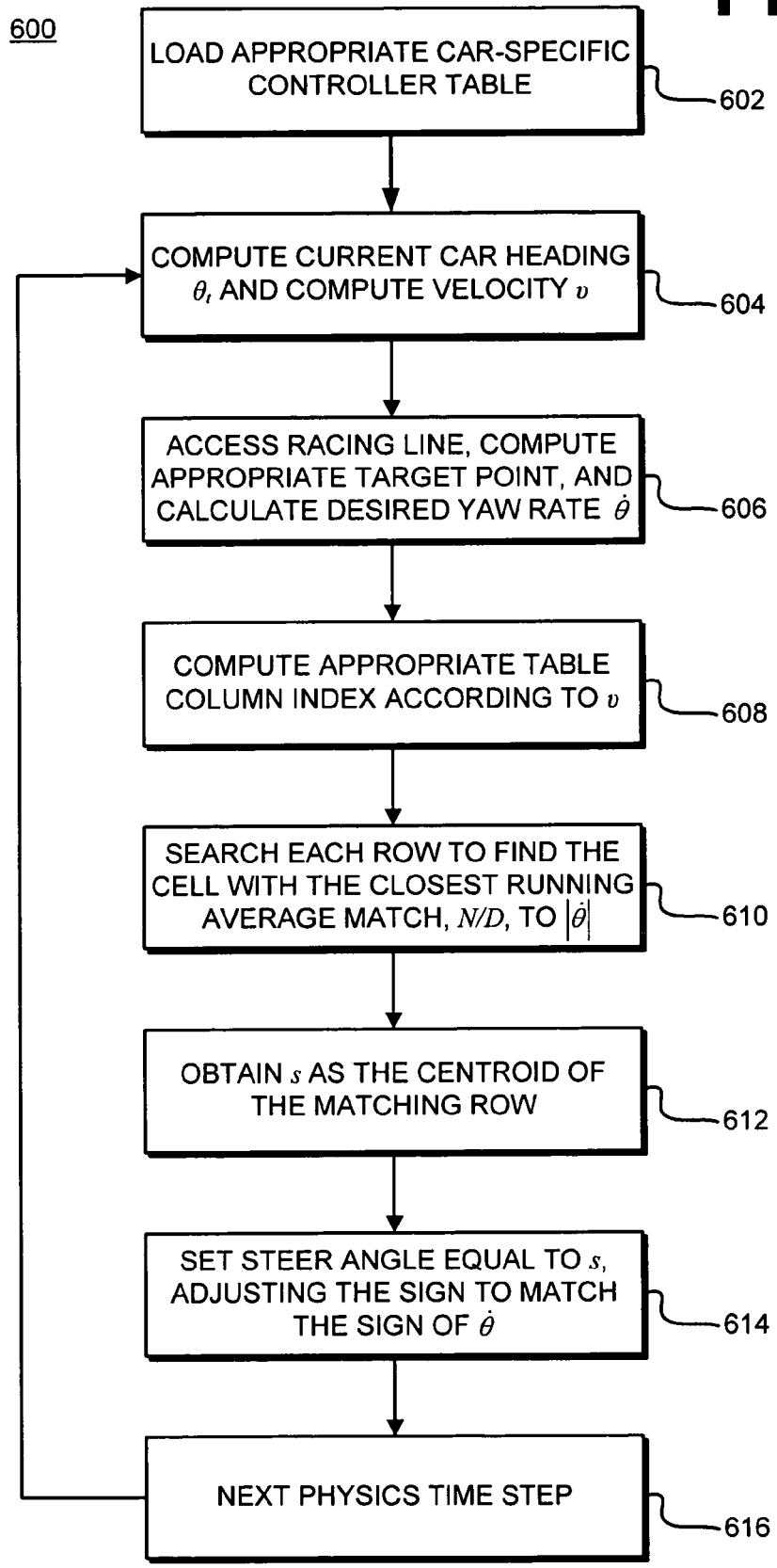
FIG. 6 is a flow diagram depicting the operations of one implementation of a controller using a two-dimensional data table for controlling movement of a vehicle.

After the learning process 500 according to the implementation of FIG. 5 is completed and the video game is subsequently played, each AI-controlled car will run the controller module. One implementation of a controller process 600 using the parameter table according to FIG. 4 is shown in FIG. 6. The controller process 600 begins with a loading operation 602 in which an appropriate car-specific parameter table is loaded into the controller module.

A first computing operation 604 follows in which the current car directional heading $\theta_t$ and velocity v are computed. In a second computing operation 606, a base racing line is accessed, an appropriate target point is computed (as depicted in FIG. 2), and a desired yaw rate $\dot{\theta}$ is calculated.

A third computing operation 608 computes an appropriate table column index according to the velocity value v. Then, in a searching operation 610, each cell in the identified column is searched to find the cell with the closest running average match, N/D, to $|\dot{\theta}|$. In an obtaining operation 612, the centroid value of the range of steering values of the matching row is obtained as s. A setting operation 614 then sets the steering angle equal to s, adjusting the sign to match the sign of $\dot{\theta}$. Finally, the controller process 600 returns to the first computing operation 604 in an iteration operation 616 at the next time step for the cycle of the physics engine.

Note that that the control algorithm of FIG. 6 may also be run during the learning process at development time, so the controller is continually used at the same time as its parameters in the table are updated. Alternatively, the initial controller can be utilized all the time during learning, and store the updated table at the end without ever making use of it. In principle, during the modeling of the physical system, it should not matter during the learning process whether the controller that is used is a good one or a poor one. However, the initial, non-updated controller is likely to not work well in all conditions (i.e., the controller may over-steer and/or under-steer at certain velocities and certain desired yaw rates). This is likely to result in the car going off track or skidding more often, and thus will reduce the efficiency of the training process. Thus, rather than retaining the initial controller values, it may be preferable to make use of the continuously updated control parameters during the learning process.

Figure 7:
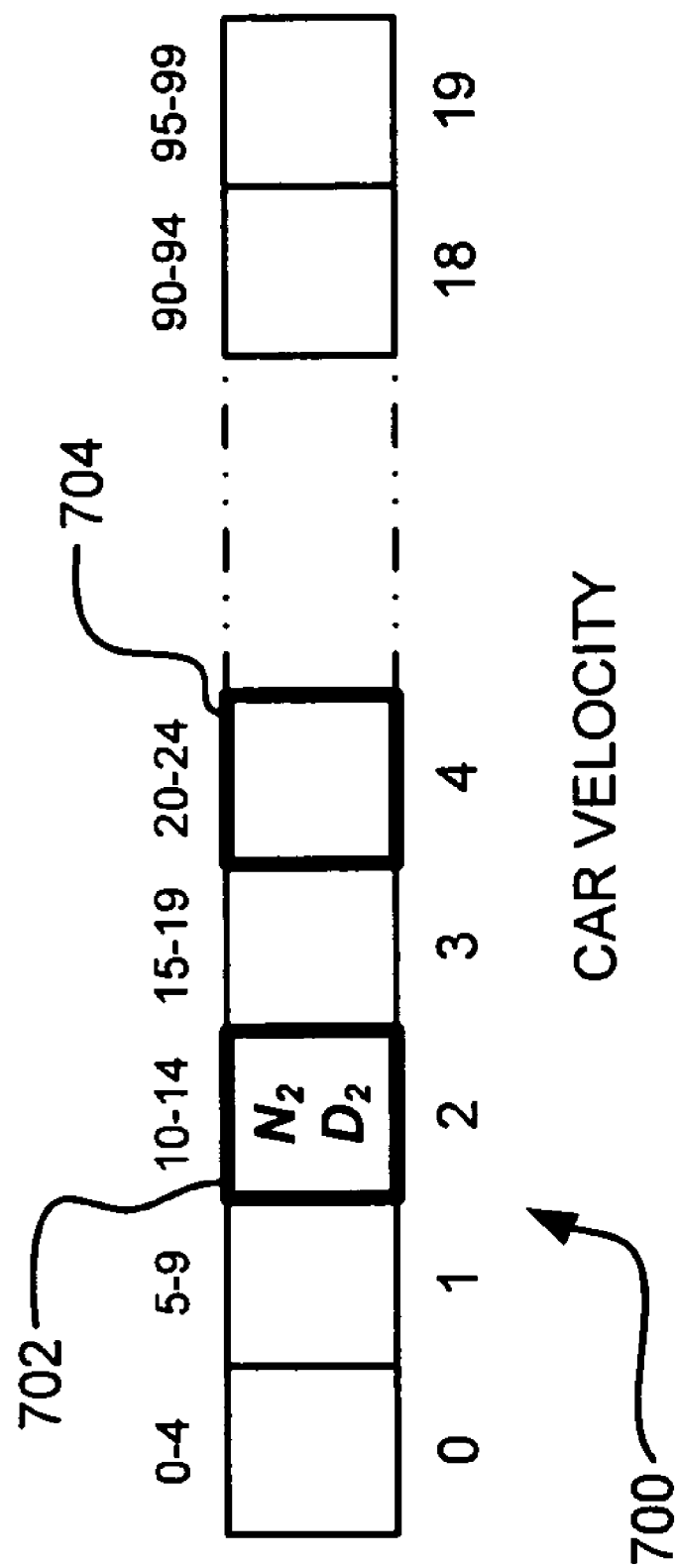
FIG. 7 is a schematic diagram of a one-dimensional table for storing control parameter data.

While the above system works well, a second implementation with a simpler, faster table may alternatively be employed. Rather than subdivide the steering angle s to index the table, the table may be reduced to a single dimension and indexed by velocity only, as shown in FIG. 7. Within this table 700, running average values of a linear relation parameter c (comprising a numerator N and denominator D) may be stored, where $c=G(v)$ and $G(v)$ is a speed-dependent quantity ("gain"). The linear relation parameter c is an approximation value based on the assumption that given fixed velocity, yaw rate varies linearly with the steering control setting as follows:

$$\dot{\theta} \approx c \times s. \quad (3)$$

For example, in the learning phase, if the car was traveling at 12 meters/second, then the numerator $N_2$ in the cell 702 at column 2 would be updated with the running total of the linear relation parameter c and the denominator $D_2$ would be updated with the total count of updates to the cell 702. If during a subsequent control phase the car was traveling at 24 meters/second, then the cell 704 in column 4 would be accessed to return the linear relation parameter c stored there.

The advantage of using this reduced table is that there are now fewer parameters to estimate and so learning may be more reliable and robust. However, the flexibility to discretely model nonlinear variation in yaw rate with steering angle that the model of FIG. 4 provides is lost. In practice, both systems appear to operate with very similar fidelity. Note that the same linear table-based model may also be used for measuring the acceleration and brake responses of the vehicle, respectively.

Figure 8:
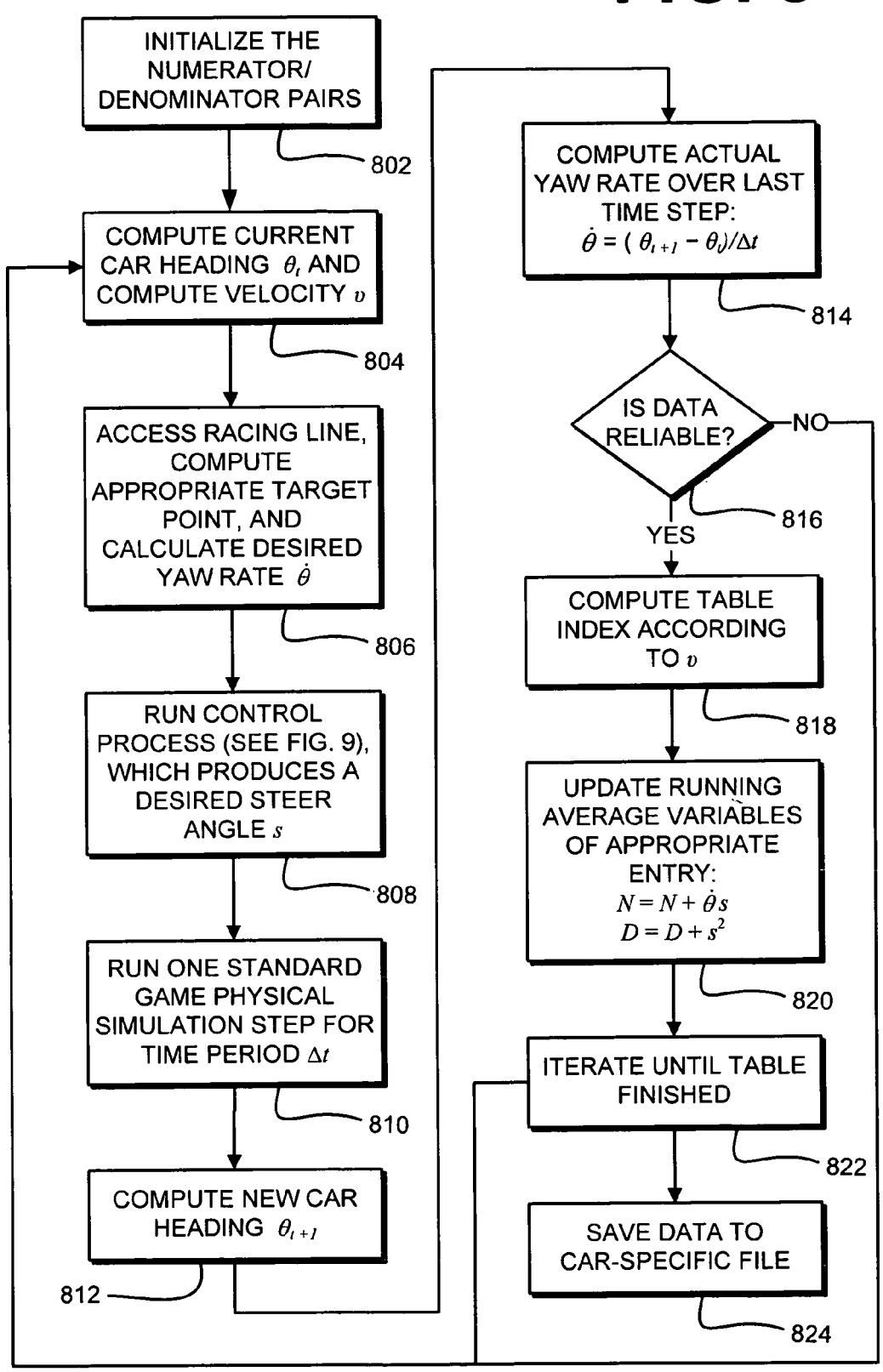
FIG. 8 is a flow diagram depicting the operations of one implementation of a learning controller system using a one-dimensional data table.

An implementation of a learning process using the linear table model of FIG. 7 for determining steering parameters at development time is depicted in FIG. 8. The learning process 800 begins with an initialization operation 802 in which the numerator/denominator pairs are initialized with some value. The controller needs 'priming' so that it can be used before (and at the same time as) any values are stored in the table. For example, every table value may simply be set to N=2 and D=1.

A first computing operation 804 follows in which the current car directional heading $\theta_t$ and velocity v are computed. In a second computing operation 806, a base racing line is accessed, an appropriate target point is computed (as depicted in FIG. 2), and a desired yaw rate $\dot{\theta}$ is calculated.

Next a process operation 808 is run wherein the control controller produces a desired steering angle s. The operations performed by the controller in computing the steering angle s are more fully described with respect to FIG. 9 herein. In the following simulation operation 810, a standard game physical simulation step for time period $\Delta t$ is performed. In a third computing operation 812, a new car heading $\theta_{t+1}$ is calculated. Using the new direction information $\theta_{t+1}$, a fourth computing operation 814 computes the actual yaw rate over last time step: $\dot{\theta}=(\theta_{t+1}-\theta_t)/\Delta t$.

A decision operation 816 is then performed ensure the reliability of the data. Indicators of unreliable data may, for example, include: s=0, (i.e., no steering occurred); the sign of s is different from sign of $\dot{\theta}$ (i.e. the car turns opposite to the steering input); the car is skidding; and the car is off the track. If any of these conditions is true, the process returns to the first computing operation 804. If in the decision operation 816, the data is considered reliable for this time step, a fifth computing operation 818 computes an appropriate table cell index according to v.

Next, in an updating operation 820, a running average of the variables of the appropriate cell entry are updated. The best linear fit, $\dot{\theta} \approx c \times s$, for all the data in each velocity-indexed cell of the table is desired. Assuming each cell has been assigned N example pairs of data, $\{s_n, \dot{\theta}_n\}_{n=1}^{N}$, at some arbitrary given time during learning, then the best value for c at that point is, in the standard "least squares" sense, that which minimizes the squared error:

$$\sum_{n=1}^{N}(\dot{\theta}_n - cs_n)^2. \quad (4)$$

The analytic solution for the best c is well-known and given by:

$$c = \frac{\sum_{n=1}^{N}\dot{\theta}_n s_n}{\sum_{n=1}^{N} s_n^2} \quad (5)$$

From this it can be seen that if 'running' value of c is to be computed at any point during learning, then separate running totals of:

$$N = \sum_{n=1}^{N}\dot{\theta}_n s_n, \text{ and} \quad (6)$$

$$D = \sum_{n=1}^{N} s_n^2 \quad (7)$$

must be maintained from which c=N/D can be simply evaluated. So in every iteration of the updating operation 820, the updates become $N=N+\dot{\theta}s$ and $D=D+s^2$ as implied by equations (6) and (7).

Once the cell values are updated, the learning process 800 iterates in an iteration operation 822 by returning to the first computing operation 804 until the learning process 800 has optimized the steering parameters. The criterion for termination of the learning process may be exactly the same as discussed above with respect to FIG. 5. In a final saving operation 824, the optimized car-parameter values of the table for the particular car are saved to a car-specific file.

In order to obtain a variety of plentiful data, the learning process 800 may be run for each car option while each car drives 3 laps on each of 5 different tracks. This is generally sufficient to ensure that the speed-dependent steering, acceleration, and braking response models converge to acceptably accurate average values. The controller is only initialized using the initialization operation 802 at the start of the first lap of the first track. The controller is thus continuously updated, and should continuously improve, as the car continues to drive around the track. This learning process 800 is repeated, and is typically fully automated to run over the full car set, every time there is a change in the physics model and/or the car parameters.

Figure 9:
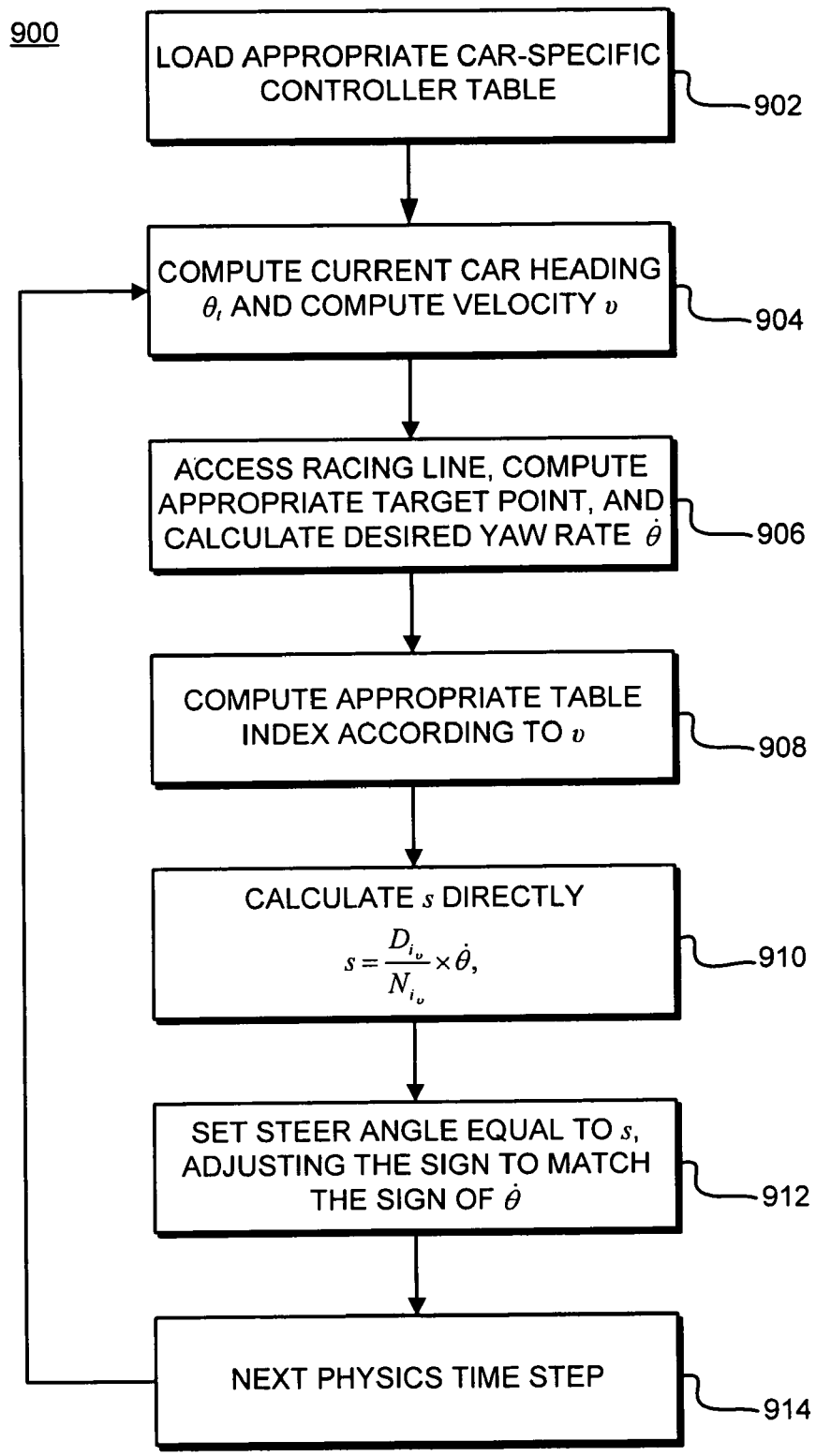
FIG. 9 is a flow diagram depicting the operations of one implementation of a controller using a one-dimensional data table for controlling movement of a vehicle.

After the learning process 800 according to FIG. 8 is completed and the video game is subsequently played, each AI-controlled car will run the controller module. Another implementation of a controller process 900 using a parameter table according to FIG. 7 is shown in FIG. 9. The controller process 900 begins with a loading operation 902 in which an appropriate car-specific parameter table is loaded into the controller module.

A first computing operation 904 follows in which the current car directional heading $\theta_t$ and velocity v are computed. In a second computing operation 906, a base racing line is accessed, an appropriate target point is computed (as depicted in FIG. 2), and a desired yaw rate $\dot{\theta}$ is calculated.

Recalling FIG. 2, a determination was made as to where the "target point" should be on the racing line. The target point is determined to be a distance d along the racing line. Typically, d may be made proportional to speed such that effectively the target point is a given "look-ahead" time along the racing line. For example, if the look-ahead is specified to be 0.2 seconds, and the car is traveling at 30 m/s, then d is 30×0.2=6 meters.

The look-ahead time should be set reasonably accurately. If this time is set to too high a value, the car may look too far ahead and tend to over-steer and cut corners. If the look-ahead is too low, the car may under-steer and miss turns or, in a worst case, oscillate. The look-ahead parameter is generally car-dependent. For example, for an Audi R8, which is very agile at cornering, the 'best' value may be quite small, while for a Dodge Challenger, which steers extremely sluggishly, a good value may be much higher. For a car such as a Ford Focus, an intermediate value may be appropriate.

In one implementation, the learning controller model may be used to determine the car look-ahead time. All the cells in the velocity-indexed linear steering table of FIG. 7 may be averaged to find a measure of "overall steering agility" $\alpha$ for a specific car, i.e., $$\alpha = \frac{1}{20}\sum_{i=0}^{19}\frac{N_i}{D_i}. \tag{8}$$

This value will likely be higher for the Audi R8 than the Dodge Challenger, since these tabulated values are the average yaw rates for a fixed value of steering and should be higher for more agile cars. Once a measure of overall steering agility of a car is determined (which is a speed-independent value of G, averaged across all cells), and the less steerable the car is considered to be, the further ahead along the desired racing line the controller will look (i.e., the larger d will be in FIG. 2) in order to make a steering decision. If the actual look-ahead value used to find the target point is set to be: Look-ahead=$T_{target}/\alpha$ such that the look-ahead increases as the agility decreases (and vice-versa), then only a single parameter $T_{target}$ needs to be manually tuned across all cars, and the troublesome car-dependence is absorbed into the automatically-derived parameter $\alpha$.

Returning to FIG. 9, a third computing operation 908 computes an appropriate table cell index $i_v$ according to the velocity value v. Then, given a desired $\dot{\theta}$, s is calculated directly in a fourth computing operation 910 via the linear assumption of equation (3):

$$s = \frac{D_{i_v}}{N_{i_v}} \times \dot{\theta}, \tag{9}$$

where $N_{i_v}$ and $D_{i_v}$ are the appropriate quantities stored in the table at the velocity index $i_v$. This is a very efficient calculation and is quicker than having to search across a table as in FIG. 4. A setting operation 912 then sets the steering angle equal to s, adjusting the sign to match the sign of $\dot{\theta}$. Finally, the controller process 900 returns to the first computing operation 904 in an iteration operation 914 at the next time step for the cycle of the physics engine.

Note that that this control algorithm of FIG. 9 is also run during the learning process at development time, so the controller is continually used at the same time as its parameters in the table are updated. Alternatively, the initial controller can be utilized all the time during learning, and store the updated table at the end without ever making use of it. In principle, during the modeling of the physical system, it should not matter during the learning process whether the controller that is used is a good one or a poor one. However, the initial, non-updated controller is likely to not work well in all conditions (i.e., the controller may over-steer and/or under-steer at certain velocities and certain desired yaw rates). This is likely to result in the car going off-track or skidding more often, and thus will reduce the efficiency of the training process. Thus, rather than retaining the initial controller values, it is preferable to make use of the continuously updated control parameters during the learning process.

A learning system including acceleration and braking models for the controller may be considered exactly analogous to the steering model. Like the steering case, both one- and two-dimensional tables may be implemented. The principal difference is that instead of modeling yaw rate in the tables, deceleration is modeled in terms of brake control setting, and acceleration is modeled in terms of accelerator setting.

In the case of both braking and acceleration, in place of yaw rate $\dot{\theta}$ the quantity modeled is the change in velocity $\dot{v}=(v_{t+1}-v_t)/\Delta t$. In the case of accelerator control, this would be primarily a positive quantity. When braking, it should be mainly negative.

The linear model for acceleration, analogous to the steering case in equation (3), then becomes $\dot{v} \approx c \times a$, where a is the accelerator setting. Similarly for braking, $\dot{v} \approx c \times b$, where b is the brake setting. These models (i.e., the running averages c) are updated exactly analogously to, and concurrent with, the steering model, although there may be an assumption in the control system that braking and accelerator controls will never be simultaneously actuated.

So, analogous with equations (6) and (7), updates of $N=N+\dot{v}_n a_n$ and $D=D+a_n^2$ are maintained in the acceleration case, where D and N are specific to the acceleration model. Values of D and N ($N=N+\dot{v}_n b_n$ and $D=D+b_n^2$) specific to braking are analogously maintained. Thus, in the control phase, if the desired speed change $\dot{v}$ (derived from the desired speed profile associated with the racing line) was positive, the accelerator would be set to $$a = \dot{v} \times \frac{D}{N}.$$

If the desired speed change were negative, the brake would be set to $$b = \dot{v} \times \frac{D}{N}.$$

Note that it is still perfectly reasonable to model changes in speed $\dot{v}$ using tables that are themselves indexed by current speed v.

Figure 10:
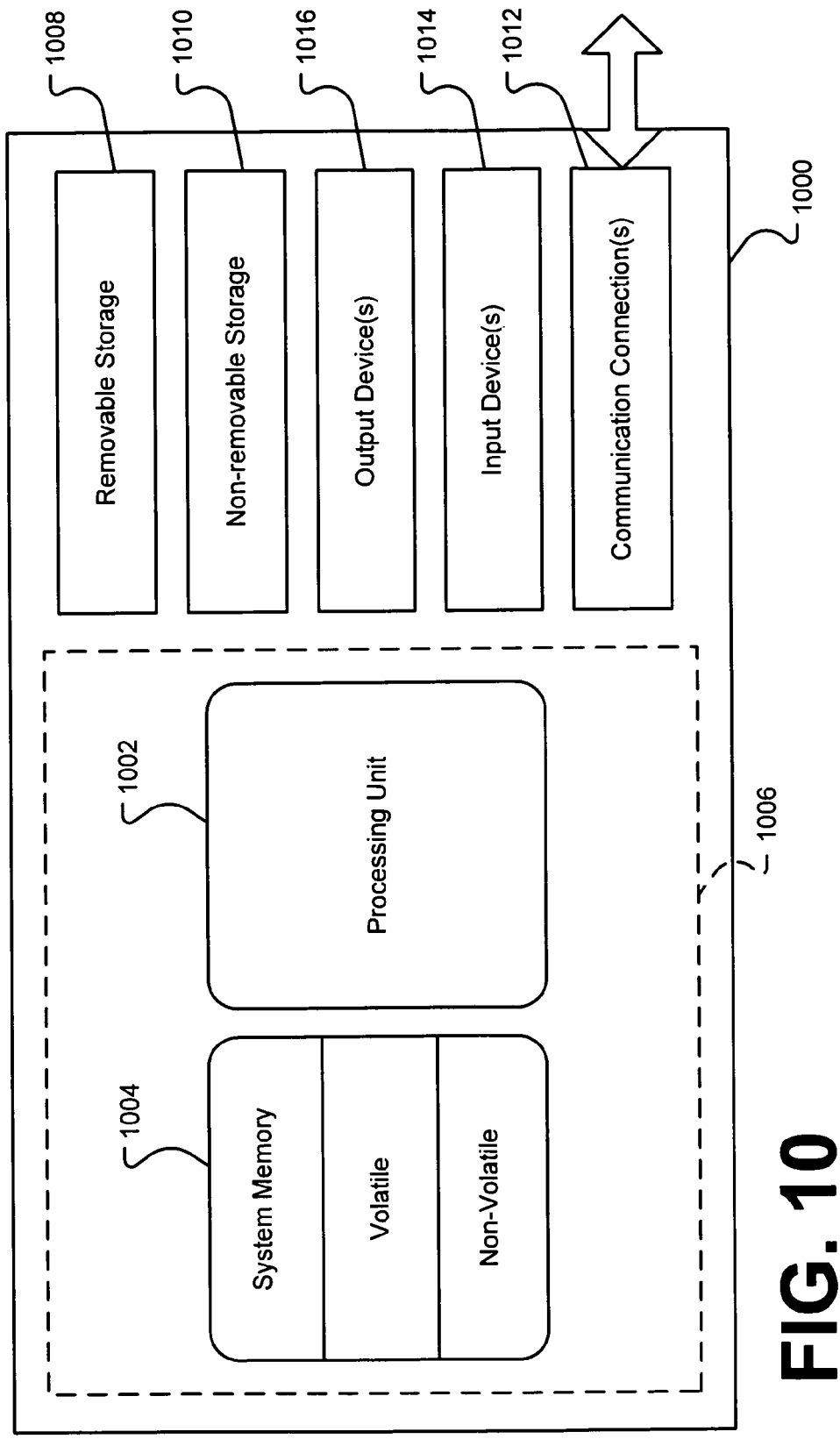
FIG. 10 is a schematic diagram of an exemplary computer system for implementing a learning controller system for vehicle control.

FIG. 10 illustrates an exemplary computer system 1000 for controlling a simulated or actual vehicle as described herein. In one implementation, the computer system 1000 may be embodied by a desktop computer, video game consoles, set top boxes, portable gaming systems, although other implementations, for example, files server computers, laptop computers, personal digital assistants, and mobile phones may incorporate the described technology. The computer system 1000 typically includes at least one processing unit 1002 and memory 1004. Depending upon the exact configuration and type of the computer system 1000, the memory 1004 may be volatile (e.g., RAM), non-volatile (e.g., ROM and flash memory), or some combination of both. The most basic configuration of the computer system 1000 need include only the processing unit 1002 and the memory 1004 as indicated by the dashed line 1006.

The computer system 1000 may further include additional devices for memory storage or retrieval. These devices may be removable storage devices 1008 or non-removable storage devices 1010, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 1002. Information, for example, car-dependent parameter values and car control data, may be stored on the storage media using any method or technology for storage of data, for example, computer readable instructions, data structures, and program modules.

The computer system 1000 may also have one or more communication interfaces 1012 that allow the system 1000 to communicate with other devices. The communication interface 1012 may be connected with network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data may be transmitted to and from the communication interface 1012 over the network via a modulated data signal, e.g., a carrier wave or other transport medium. A modulated data signal is an electromagnetic signal with characteristics that can be set or changed in such a manner as to encode data within the signal.

In some implementations, articles of manufacture, for example, the learning system module or controller module, are provided as computer program products. One implementation of a computer program product provides a computer program storage medium readable by the computer system 1000 and encoding a computer program. Another implementation of a computer program product may be provided in a computer data signal embodied in a carrier wave by the computer system 1000 and encoding the computer program.

The computer system 1000 may further have a variety of input devices 1014 and output devices 1016. Exemplary input devices 1014 may include a keyboard, a mouse, a joystick, a tablet, a touch screen device, a scanner, a visual input device, and a microphone or other sound input device. Exemplary output devices 1016 may include a display monitor, a printer, and speakers. Such input devices 1014 and output devices 1016 may be integrated with the computer system 1000 or they may be connected to the computer system 1000 via wires or wirelessly, e.g., via a Bluetooth protocol. These integrated or peripheral input and output devices are generally well known and are not further discussed herein. In one implementation, program instructions implementing the methods or the modules for the controller including the learning system, are embodied in the memory 1004 and storage devices 1008 and 1010 and executed by processing unit 1002. Other functions, for example, handling network communication transactions, may be performed by an operating system in the nonvolatile memory 1004 of the computer system 1000.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Connection references e.g., attached, coupled, connected, and joined are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method for optimizing a set of vehicle-dependent control parameters for use in controlling a vehicle, the method comprising establishing an initial set of vehicle-dependent control parameters, the vehicle-dependent control parameters comprising car-specific values for control functions including at least one of braking, accelerating or steering;

computing a first set of vehicle control values based upon the initial set of vehicle-dependent control parameters;

computing a first set of motional data for the vehicle at a first time;

controlling movement of the vehicle based upon the first set of vehicle control values;

computing a second set of motional data for the vehicle at a second time later than the first time;

computing a revised set of vehicle-dependent control parameters based upon a comparison of the second set of motional data with the first set of motional data;

computing a second set of vehicle control values based upon the revised set of vehicle-dependent control parameters;

without user intervention, iterating through these operations by replacing the initial set of vehicle-dependent control parameters in the establishing operation with the revised set of vehicle-dependent control parameters for each successive iteration until an optimal set of vehicle-dependent control parameters is computed;

storing the optimal set of vehicle-dependent control parameters; and using the stored optimal set of vehicle-dependent control parameters by a control system to maintain a computer-controlled car along a path in a computer video game.

2. The method of claim 1, wherein the revised set of vehicle-dependent control parameters is dependent upon a velocity of the vehicle.

3. The method of claim 1 further comprising
subdividing the revised set of vehicle-dependent control parameters into discrete value ranges; and
storing the revised set of vehicle-dependent control parameters in a single-dimension table according to the discrete value ranges.

4. The method of claim 1 further comprising
subdividing the revised set of vehicle-dependent control parameters into discrete value ranges; and
storing the revised set of vehicle-dependent control parameters in a multi-dimension table according to the discrete value ranges.

5. The method of claim 1 further comprising adapting the second set of vehicle control values to control at least one of vehicle steering, vehicle acceleration, and vehicle braking.

6. A method for optimizing a set of vehicle-dependent control parameters for use in controlling a vehicle, the method comprising
during vehicle simulation, inputting an initial set of vehicle-dependent control parameters into a controller;
computing under direction of the controller an initial set of vehicle control values based upon the initial set of vehicle-dependent control parameters;
inputting the initial set of vehicle control values into a physics engine;
controlling movement of the vehicle under direction of the controller based upon the initial set of vehicle control values;
inputting a first set of motional data for the vehicle at a first time output by the physics engine into a learning system;
inputting a second set of motional data for the vehicle at a second time later than the first time output by the physics engine into the learning system; and
computing a revised set of vehicle-dependent control parameters under direction of the learning system based upon a comparison of the second set of motional data with the first set of motional data;
computing a second set of vehicle control values under direction of the controller based upon the revised set of vehicle-dependent control parameters;
without user intervention, iterating through these operations by replacing the initial set of vehicle-dependent control parameters in the first inputting operation with the revised set of vehicle-dependent control parameters for each successive iteration until an optimal set of vehicle-dependent control parameters is computed;
storing the optimal set of vehicle-dependent control parameters; and
using the stored optimal set of vehicle-dependent control parameters by a control system to maintain a computer-controlled car along a path in a computer video game.

7. The method of claim 6, wherein the revised set of vehicle-dependent control parameters is dependent upon a velocity of the vehicle.

8. The method of claim 6 further comprising
subdividing the revised set of vehicle-dependent control parameters into discrete value ranges under direction of the learning system; and
storing the revised set of vehicle-dependent control parameters in a single-dimension table under direction of the learning system according to the discrete value ranges.

9. The method of claim 6 further comprising
subdividing the revised set of vehicle-dependent control parameters into discrete value ranges under direction of the learning system; and
storing the revised set of vehicle-dependent control parameters in a multi-dimension table under direction of the learning system according to the discrete value ranges.

10. The method of claim 6 further comprising adapting the second set of vehicle control values under direction of the controller to control at least one of vehicle steering, vehicle acceleration, and vehicle braking.

11. A method for optimizing steering parameters for using in controlling a vehicle, the method comprising:
(a) using a processing unit coupled to a memory, initializing running average variables stored in a two-dimensional table indexed based on a steering angle and a velocity;
(b) computing a current vehicle heading and a current vehicle velocity;
(c) accessing a racing line, computing a target point and calculating a desired yaw rate;
(d) running a control process which produces a desired steering angle;
(e) running one game physical simulation step for a pre-specified time period;
(f) computing a new car heading;
(g) computing an actual yaw rate over the pre-determined specified time period;
(h) computing table indices based on the steering angle and the velocity;
(i) updating running average variables of an entry stored in the two-dimensional table indexed based on computed tables indices;
(j) iterating through steps (b)-(i) until a pre-determined criteria has been met; and
(k) saving the running average variables stored in the two-dimension table to a vehicle-specific file.

12. The method of claim 11, wherein the pre-determined criteria is based on a measure of accuracy of the control process.

* * * * *